United States Patent [19]

Tsuji et al.

[11] Patent Number: 5,223,935
[45] Date of Patent: Jun. 29, 1993

[54] ELECTRONIC CAMERA WITH AUTOMATIC EXPOSURE CONTROL

[75] Inventors: Akio Tsuji, Tokyo; Teruo Sano, Kawasaki, both of Japan

[73] Assignee: Casio Computer Co., Ltd., Tokyo, Japan

[21] Appl. No.: 676,808

[22] Filed: Mar. 28, 1991

[30] Foreign Application Priority Data

| Apr. 2, 1990 | [JP] | Japan | 2-85023 |
| Apr. 2, 1990 | [JP] | Japan | 2-85025 |
| Apr. 2, 1990 | [JP] | Japan | 2-85027 |

[51] Int. Cl.⁵ .......................................... H04N 5/238
[52] U.S. Cl. ................................. 358/228; 358/277; 358/209
[58] Field of Search ............... 358/227, 228, 209, 909; 250/201.1, 205; 354/410, 441

[56] References Cited

U.S. PATENT DOCUMENTS

| 4,598,322 | 7/1986 | Atherton | 358/228 |
| 4,739,409 | 4/1988 | Baumeister | 358/213.16 |
| 4,872,058 | 10/1989 | Baba et al. | 358/227 |
| 4,969,044 | 11/1990 | Hijikata et al. | 358/227 |
| 4,969,045 | 11/1990 | Haruki et al. | 358/228 |
| 4,998,162 | 3/1991 | Kondo et al. | 358/41 |
| 5,040,072 | 8/1991 | Tsuji et al. | 358/228 |
| 5,043,816 | 8/1991 | Nakano et al. | 358/209 |
| 5,049,997 | 9/1991 | Arai | 358/213.11 |
| 5,065,247 | 11/1991 | Haruki et al. | 358/228 |

Primary Examiner—Herbert Goldstein
Assistant Examiner—Tuan V. Ho
Attorney, Agent, or Firm—Frishauf, Holtz, Goodman & Woodward

[57] ABSTRACT

An electronic camera includes an optical device having a diaphragm for focusing an optical image of subject, an image sensor for sensing the focused optical image and for converting the sensed image into electric signals, a luminous energy level detector for detecting a level of luminous energy based on the electric signals, an exposure condition determining device for determining exposure-time data and diaphragm control data based on the level of luminous energy, an exposure-time control device for a time that the optical image is exposed to the image sensor based on the exposure-time data, a diaphragm controller for controlling the diaphragm based on the diaphragm control data, and a processor for processing the electric signals produced by the image sensor at proper exposure conditions so as to produce a video signal.

13 Claims, 12 Drawing Sheets

| EV | S | F | DENOMINATOR OF EQUATION IN SPOT PHOTOMETRY | DENOMINATOR OF EQUATION IN TOTAL PHOTOTRY | A REFERENCE VALUE | B REFERENCE VALUE | C REFERENCE VALUE |
|---|---|---|---|---|---|---|---|
| 8 | 1/30 | 2.8 | | | 34.008 | | |
| 8.5 | 1/30 | 3.5 | | | 21.765 | | |
| 9 | 1/30 | 4 | $CS \pm \alpha C$ | $CT \pm \beta C$ | 16.664 | | 2.083 |
| 9.5 | 1/30 | 4.5 | | | 13.167 | | 1.426 |
| 10 | 1/60 | 4 | | | 8.332 | | 1.0 (REFERENCE) |
| 10.5 | 1/60 | 4.5 | | | 6.583 | | 0.709 |
| 11 | 1/60 | 5.6 | | | 4.251 | | 0.529 |
| 11.5 | 1/60 | 6.7 | | | 2.970 | | 0.355 |
| 12 | 1/60 | 6 | | | 2.083 | | |
| 12.5 | 1/125 | 6.7 | | | 1.426 | | |
| 13 | 1/125 | 8 | $AS \pm \alpha A$ | $AT \pm \beta A$ | 1.0 (REFERENCE) | | |
| 13.5 | 1/125 | 9.5 | | | 0.709 | | |
| 14 | 1/125 | 11 | | | 0.529 | | |

FIG. 4A

| EV | S | F | DENOMINATOR OF EQUATION IN SPOT PHOTOMETRY | DENOMINATOR OF EQUATION IN TOTAL PHOTOTRY | A REFERENCE VALUE | B REFERENCE VALUE | C REFERENCE VALUE |
|---|---|---|---|---|---|---|---|
| 14.5 | 1/250 | 9.5 | | | 0.355 | | |
| 15 | 1/250 | 11 | | | 0.265 | | |
| 15.5 | 1/250 | 13 | BS+αB | BT+βB | 0.189 | 2.970 | |
| 16 | 1/250 | 16 | | | 0.125 | 2.083 | |
| 16.5 | 1/500 | 13 | | | 0.095 | 1.426 | |
| 17 | 1/500 | 16 | | | 0.063 | 1.0 (REFERENCE) | |
| 17.5 | 1/500 | 19 | | | 0.044 | 0.709 | |
| 18 | 1/500 | 22 | | | 0.033 | 0.529 | |

FIG. 4B

ELECTRONIC CAMERA WITH AUTOMATIC EXPOSURE CONTROL

BACKGROUND OF THE INVENTION

1. Field of the Invention

The present invention relates to an automatic exposure control apparatus used for an electronic image sensing apparatus, e.g., an electronic still camera or a video camera, using a solid-state image sensing element such as a CCD (Charge Coupled Device).

2. Description of the Related Art

Recently, a camera using a silver chloride film, an electronic still camera using an electronic image sensing means such as a solid-state image sensing element, or a video movie camera, has been equipped with a system for automatically controlling exposure.

In such an automatic exposure system, a photometric sensor is generally arranged in a camera main body so that an aperture and an exposure time are controlled in accordance with a detection result from the sensor.

In the above-described automatic exposure system, however, since the photometric sensor is arranged in the camera main body, it is difficult to reduce the size of the camera. In addition, since a position where a subject image is focused is different from a position where the photometric sensor is attached, the light amount of a subject image to be actually sensed differs from a light amount metered by the photometric sensor. For this reason, proper exposure control cannot always be performed.

In the above automatic exposure system, accurate metering of the light amount of a portion of a subject to be photographed is difficult to perform. If, therefore, the subject includes a very bright portion, it is difficult to perform exposure control to sense only the bright portion or other portions with proper exposure value.

SUMMARY OF THE INVENTION

The present invention has been made in consideration of the above situation, and has as its object to provide an electronic camera including an automatic exposure control apparatus which allows a reduction in size of the camera, enables proper exposure control with respect to a subject image, and can perform proper exposure control of only a desired portion of a subject to be photographed even if the subject has a very bright portion.

In order to achieve the above object, according to the present invention, there is provided an electronic camera comprising optical means having a diaphragm, for focusing an optical image of a subject on a predetermined plane, image sensing means provided on the predetermined plane, for sensing an optical image focused by the optical means so as to convert the sensed image into electric signals, luminous energy level detecting means for detecting a level of luminous energy based on the electric signals produced by the image sensing means, exposure condition determining means for determining exposure-time data and diaphragm control data in response to the level of luminous energy detected by the luminous energy level detecting means, so as to obtain the proper exposure condition, exposure-time control means for controlling time the optical image is exposed to the image sensing means, to convert the optical image into electric signals, based on the exposure time data determined by the exposure condition determining means, diaphragm control means for controlling the diaphragm based on the diaphragm control data determined by the exposure condition determining means, so as to control amount of light to which the image sensing means is exposed, and processing means for processing the electric signals produced by the image sensing means at the proper exposure condition, so as to produce a video signal.

With the arrangement described above, according to the present invention, since no special photometric sensor is required, the camera can be reduced in size. In addition, exposure control can be performed on the basis of the light amount of a focused subject image. Therefore, for example, more accurate exposure control can be performed, and a photometric operation of a portion of the subject can be accurately performed.

Additional objects and advantages of the invention will be set forth in the description which follows, and in part will be obvious from the description, or may be learned by practice of the invention. The objects an advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are views respectively showing the contents of tables in an exposure time/f-number converting section in FIG. 2;

DETAILED DESCRIPTION OF THE PREFERRED EMBODIMENTS

An embodiment of the present invention will be described below with reference to the accompanying drawings.

Figure 1:
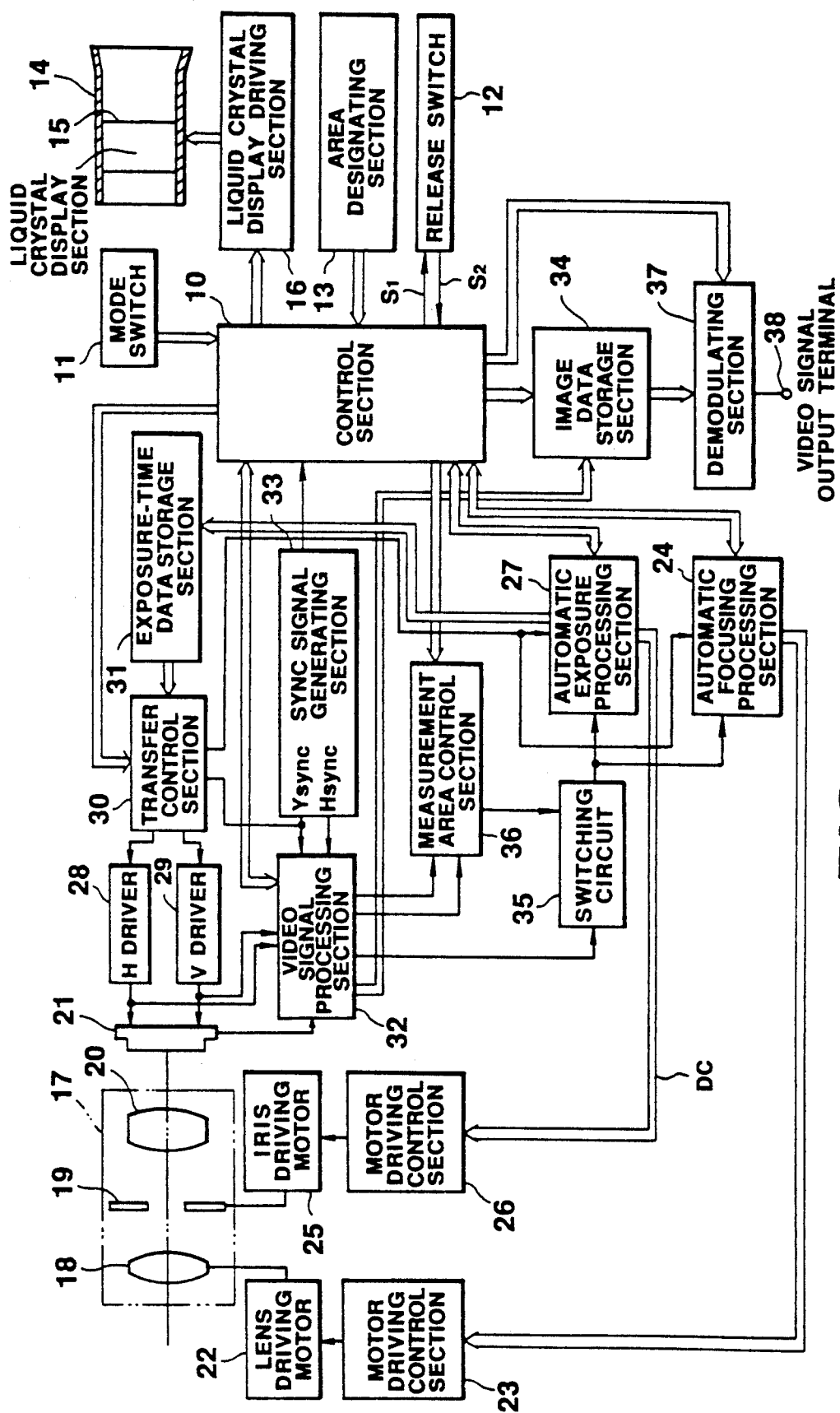
FIG. 1 is a block diagram showing an arrangement of an electronic still camera using an automatic exposure control apparatus according to the present invention.

FIG. 1 shows an arrangement of an electronic circuit in an electronic still camera. Referring to FIG. 1, a control section 10 controls operations of the respective components of the circuit. A mode switch 11, a release switch 12, and an area designating section 13 are connected to the control section 10. The mode switch 11 is used to switch photographic modes, i.e., an automatic mode including AE (automatic exposure) control and AF (automatic focusing) control, and a manual mode. The release switch 12 is operated when a subject is photographed. The area designating section 13 is constituted by operation keys of four directions, i.e., "up", "down", "left", and "right" keys for designating a photometric area for AE control or a focus area for AF control within a photographic area. Photometric operations are classified into two types: a spot photometric operation in which a photometric area is a portion of the fixed area of a photographic area; and a total photometric operation in which a photometric area is the total photographic area. A view finder 14 serves to set the above-mentioned photographic area. A liquid crystal display section 15 is arranged in this viewfinder 14. The liquid crystal display section 15 displays a designated area on a photographic area in accordance with the designation of a photometric area or a focus area by means of the area designating section 13. The liquid crystal display section 15 is driven and controlled by control signals from the control section 10 through a liquid crystal display driving section 16.

A subject image covered by the viewfinder 14 is optically focused on a solid-state image sensing element (CCD) 21 through a photographing lens 18, an iris 19, and a zoom lens 20 in an image sensing optical system 17. The photographing lens 18 is driven by a lens driving motor 22. The lens driving motor 22 is controlled by a motor driving control section 23. This motor driving control section 23 receives an automatic focusing control signal from an automatic focusing processing section 24 to obtain an optimal focal length corresponding to the focus area. The iris 19 is driven by an iris driving motor 25. The iris driving motor 25 is controlled by a motor driving control section 26. This motor driving control section 26 receives an iris control signal DC indicating a f-number corresponding to an optimal exposure value from an automatic exposure processing section 27.

The solid-state image sensing element 21 has a plurality of pixels constituted by horizontally and vertically arranged photodiodes. The element 21 converts an optical image into an electric signal having a level corresponding to the light amount of the image. The plurality of pixels of the solid-state image sensing element 21 are horizontally scanned by an H driver 28 and are vertically driven by a V driver 29, thus sequentially outputting stored charges. An exposure time (shutter speed) is controlled by changing timings at which the H driver 28 and the V driver 29 start to scan the respective pixels (as the scan start timings are delayed, the exposure time is prolonged). The scan start timings of the H and V drivers 28 and 29 are controlled by a transfer control section 30 to control the exposure time. The automatic exposure processing section 27 supplies shutter speed (exposure time) designation data stored in an exposure-time data storage section 31 to the transfer control section 30. The transfer control section 30 controls the H driver 28 and the V driver 29 in accordance with the image sensing exposure-time data supplied from the exposure-time data storage section 31, thus causing the solid-state image sensing element 21 to perform an exposure operation of the subject image for a predetermined period of time. When the predetermined period of time elapses, the transfer control section 30 scans the solid-state image sensing element 21 to cause it to transfer the stored charges. After the transfer operation of the stored charges, the transfer control section 30 outputs a transfer end signal to the automatic focusing processing section 24 and the automatic exposure processing section 27.

Electric signals output in units of pixels of the solid-state image sensing element 21 are supplied to a video signal processing section 32 in accordance with horizontal and vertical scan signals from the H driver 28 and the V driver 29. The video signal processing section 32 separates each video signal input from the solid-state image sensing element 21 into a luminance signal Y and color difference signals (R−Y) and (B−Y) in synchronism with a horizontal sync signal $H_{sync}$ output from a sync signal generating section 33. The luminance signal Y and the color difference signals (R−Y) and (B−Y) are A/D-converted and sequentially stored in an image data storage section 34 address-designated by the control section 10. The luminance signal Y is also supplied to a switching circuit 35. In addition, the image signal processing section 32 outputs a horizontal sync signal, to which the output timing of the luminance signal Y corresponds, to a measurement area control section 36. The measurement area control section 36 detects a timing at which a photometric area or a focus area designated by the area designating section 13 in advance is scanned, in accordance with vertical and horizontal sync signals from the video signal processing circuit 32, thus keeping a switching gate of the switching circuit 35 ON during the scan timing period. The measurement area control section 36 supplies the luminance signal Y corresponding to the photometric area or the focus area to the automatic exposure processing section 27 and the automatic focusing processing section 24 through the ON gate of the switching circuit 35. The automatic exposure processing section 27 obtains an optimal exposure value corresponding to the total amount of light incident on the solid-state image sensing element 21 on the basis of the luminance signal Y corresponding to the designated photometric area of the solid-state image sensing element 21. The automatic exposure processing section 27 outputs an iris control signal and exposure-time designation data respectively representing an f-number and an image sensing exposure time (shutter speed) corresponding to the optimal exposure value. The iris control signal and the exposure-time designation data are respectively supplied to the iris motor driving control section 26 and the exposure-time data storage section 31. The automatic focusing processing section 24 serves to obtain an optimal focal length on the basis of the sensed luminance signal Y corresponding to a focus area, and supplies an automatic focusing control signal for obtaining this optimal focal length to the lens motor driving control section 23.

A demodulating section 37 is connected to the image data storage section 34. The demodulating section 37 converts a digital video signal stored in the image data storage section 34 into the luminance signal Y and the difference signals (R−Y) and (B−Y) as analog video signals. The video signals from the demodulating section 37 are output from a video signal output terminal 38.

Figure 2:
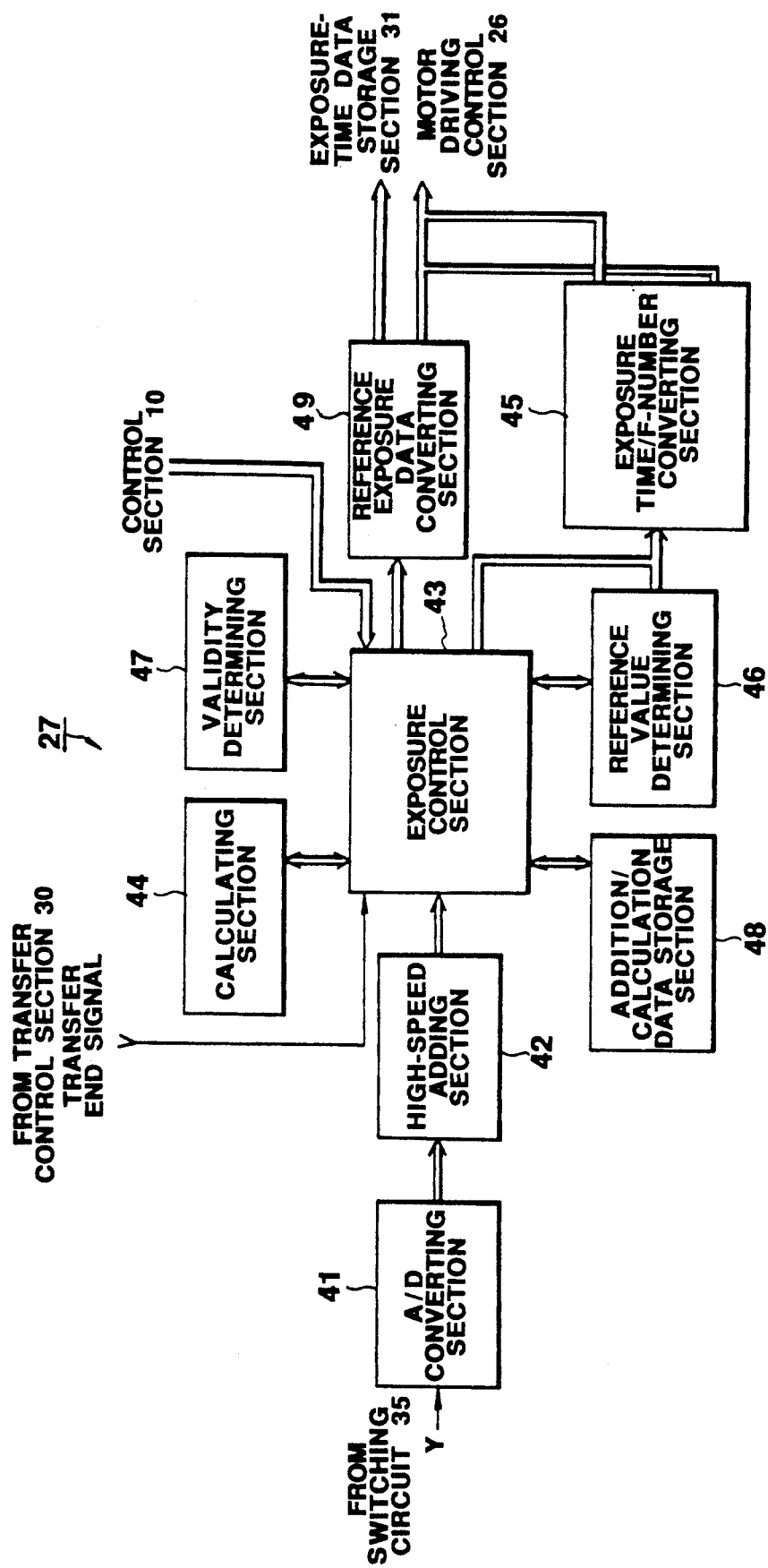
FIG. 2 is a block diagram showing a detailed circuit arrangement of an automatic exposure processing section of the electronic still camera in FIG. 1.

FIG. 2 shows an internal arrangement of the automatic exposure processing section 27. The sensed luminance signal Y corresponding to a designated photometric area, which is supplied to the automatic exposure processing section 27 through the switching circuit 35, is supplied to an A/D-converting section 41. The A/D-converting section 41 converts the sensed luminance signal Y into a digital signal corresponding to the sensed level of each pixel, and supplies it to a high-speed adding section 42. The high-speed adding section 42 adds all the digital signals having values corresponding to the amounts of light incident on the respective pixels within the designated photometric area of the solid-state image sensing element 21. The digital addition value (data) T0 obtained by adding the luminance signals Y in the high-speed adding section 42 is supplied to an exposure control section 43.

The exposure control section 43 causes a calculating section 44 to calculate a reference number or reference value N on the basis of the addition data T0 obtained by the high-speed adding section 42. The reference value N serves as a reference for selecting an optimal exposure time and an optimal f-number. More specifically, the exposure control section 43 stores three predetermined reference exposure conditions (exposure times and f-numbers) A, B, and C (see FIG. 3). The reference exposure conditions A, B, and C are respectively used in cases wherein the amount of incident light is standard, large, and small. In addition, the exposure control section 43 stores luminance data addition values (addition values in spot photometry; values obtained in advance by experiments) AS, BS, and CS from pixels of a predetermined photometric area when the reference exposure conditions A, B, and C are optimal exposure conditions, and luminance data addition values (addition values in total photometry; values obtained in advance by experiments) AT, BT, and CT from all the pixels when the reference exposure conditions A, B, and C are optimal exposure conditions. The exposure control section 43 causes the calculating section 44 to calculate the reference value N in accordance with the luminance addition data T0 actually obtained under one of the reference exposure conditions A, B, and C, predetermined luminance addition values A0, B0, C0, AT, BT, and CT, and the following equations (1) to (6). The exposure control section 43 then selects an optimal exposure time (shutter speed) S and an optimal f-number F from a conversion table (FIGS. 4A and 4B) stored in an exposure time/f-number converting section 45 by using the reference value N.

$$N = T0/(AS \pm \alpha A) \quad (1)$$

$$N = T0/(BS \pm \alpha B) \quad (2)$$

$$N = T0/(CS \pm \alpha C) \quad (3)$$

$$N = T0/(AT \pm \beta A) \quad (4)$$

$$N = T0/(BT \pm \beta B) \quad (5)$$

$$N = T0/(CT \pm \beta C) \quad (6)$$

Equation (1) is used when a designated photometric area is a predetermined partial area of the solid-state image sensing element 21 under the reference exposure condition A. Equation (2) is used when a designated photometric area is a predetermined partial area of the solid-state image sensing element 21 under the reference exposure condition B. Equation (3) is used when a designated photometric area is a predetermined partial area of the solid-state image sensing element 21 under the reference exposure condition C. Equation (4) is used when a designated photometric area is the entire area of the solid-state image sensing element 21 under the reference exposure condition A. Equation (5) is used when a designated photometric area is the enter area of the solid-state image sensing element 21 under the reference exposure condition B. Equation (6) is used when a designated photometric area is the entire area of the solid-state image sensing element 21 under the reference exposure condition C. The denominators of the respective equations are stored in the table shown in FIGS. 4A and 4B. In addition, $\alpha A$, $\alpha B$, $\alpha C$, $\beta A$, $\beta B$, and $\beta C$ are allowable errors. Therefore, for example, the reference value N obtained from equation (1) falls within the range of T0/(As+$\alpha A$) to T0/(As−$\alpha A$).

A reference value determining section 46 selects an optimal reference value from the conversion table set in the exposure time/f-number converting section 45 in accordance with the obtained reference value.

Figure 3:
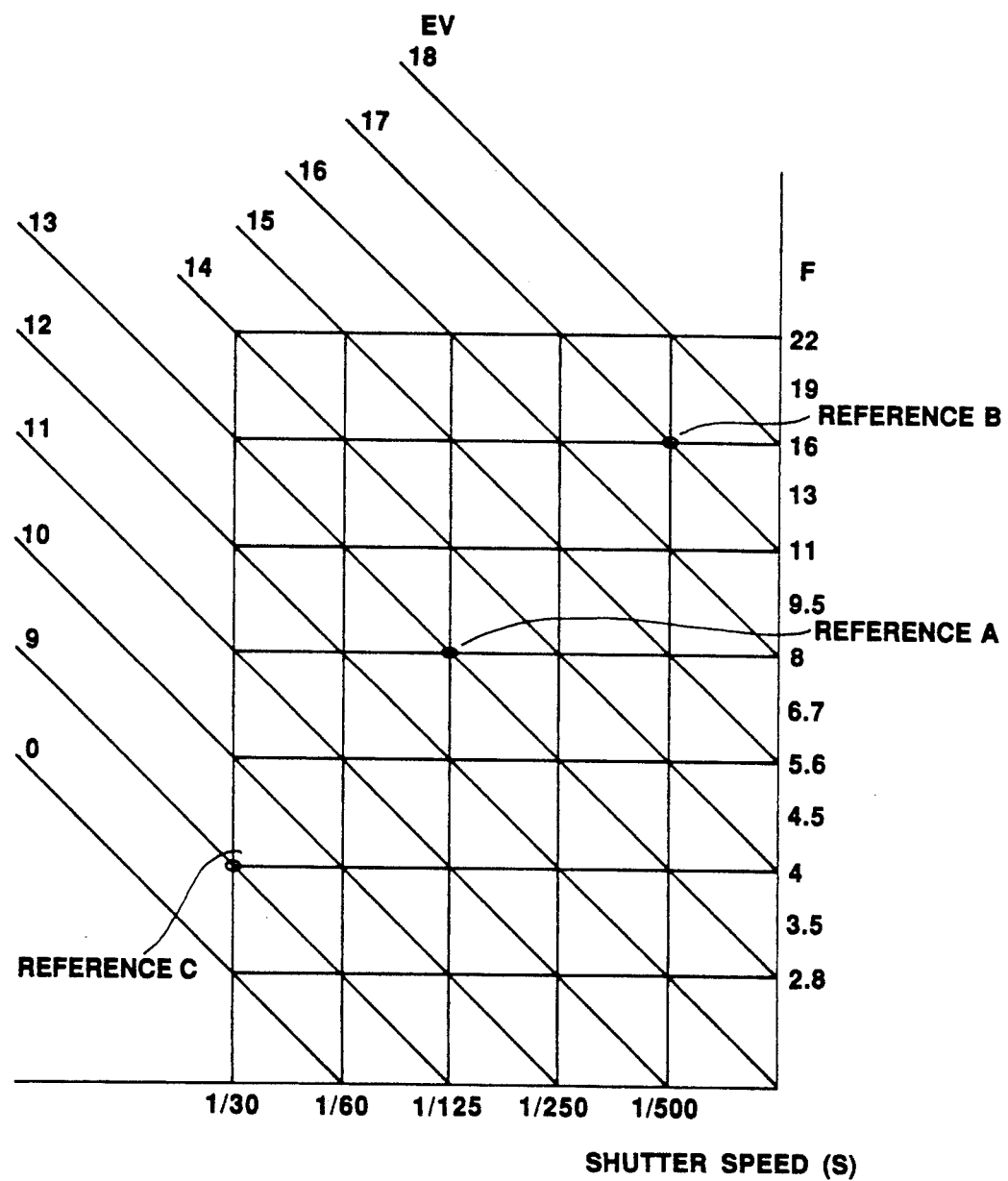
FIG. 3 is a graph showing a relationship between an exposure value EV, a shutter speed S, and an f-number F in the electronic still camera shown in FIG. 1.

FIG. 3 shows a relationship between the exposure value EV, the shutter speed (exposure time) S, and the f-number F. In this embodiment, the reference exposure condition A corresponds to the exposure value EV=13 determined by the shutter speed S=1/125 and the f-number F=8; the reference exposure condition B, the exposure value EV=17 determined by the shutter speed S=1/500 and the f-number F=16; and the reference exposure condition C, the exposure value EV=9 determined by the shutter speed S=1/30 and the f-number=4.

If the actual luminance addition value T0 under the reference exposure condition A is excessively large and exceeds a predetermined saturation state reference value S(Max), the luminance addition value T0 is obtained under the reference exposure condition B to obtain an optimal exposure value on the basis of the obtained value. If the actual luminance addition value T0 under the reference exposure condition A is excessively small and smaller than a predetermined dark state reference value S(Min), the luminance addition value T0 is obtained under the reference exposure condition C to obtain an optimal exposure value on the basis of the obtained value. Comparison between the luminance addition value T0 under the initial exposure condition A and the reference values S(Max) and S(Min) is performed by a validity determining section 47. The values S(Max) and S(Min) are data for spot photometry. In total photometry, the allowable range of addition data is from T(Max) to T(Min).

FIGS. 4A and 4B show the conversion table set in the exposure time/f-number converting section 45 in advance. In this table, the optimal exposure value EV, shutter speed (exposure time) S, and f-number F are set in correspondence with the reference value N obtained by one of equations (1) to (6). Note that an addition/ calculation data storage section 48 is connected to the exposure control section 43. This storage section 48 stores luminance addition data and allowable error data used for the above-described arithmetic processing.

When the control section 10 receives a stroke signal from the release switch 12, a converting section 49 of the automatic exposure processing section 27 supplies exposure-time data and an iris control signal to the exposure-time data storage section 31 and the iris motor driving control 26, respectively, to set the exposure time S and the f-number F corresponding to one of the reference exposure conditions A, B, and C. Thereafter, the luminance addition value T0 is obtained on the basis of the selected reference exposure condition. In response to the obtained value T0, the exposure time/f-number converting section 45 supplies exposure-time data and an iris control signal to the exposure-time data storage section 31 and the iris motor driving control section 26, respectively, to set the optimal exposure time S and the optimal f-number F.

An arrangement of the video signal processing section 32 will be described below with reference to FIG. 5.

Figure 5:
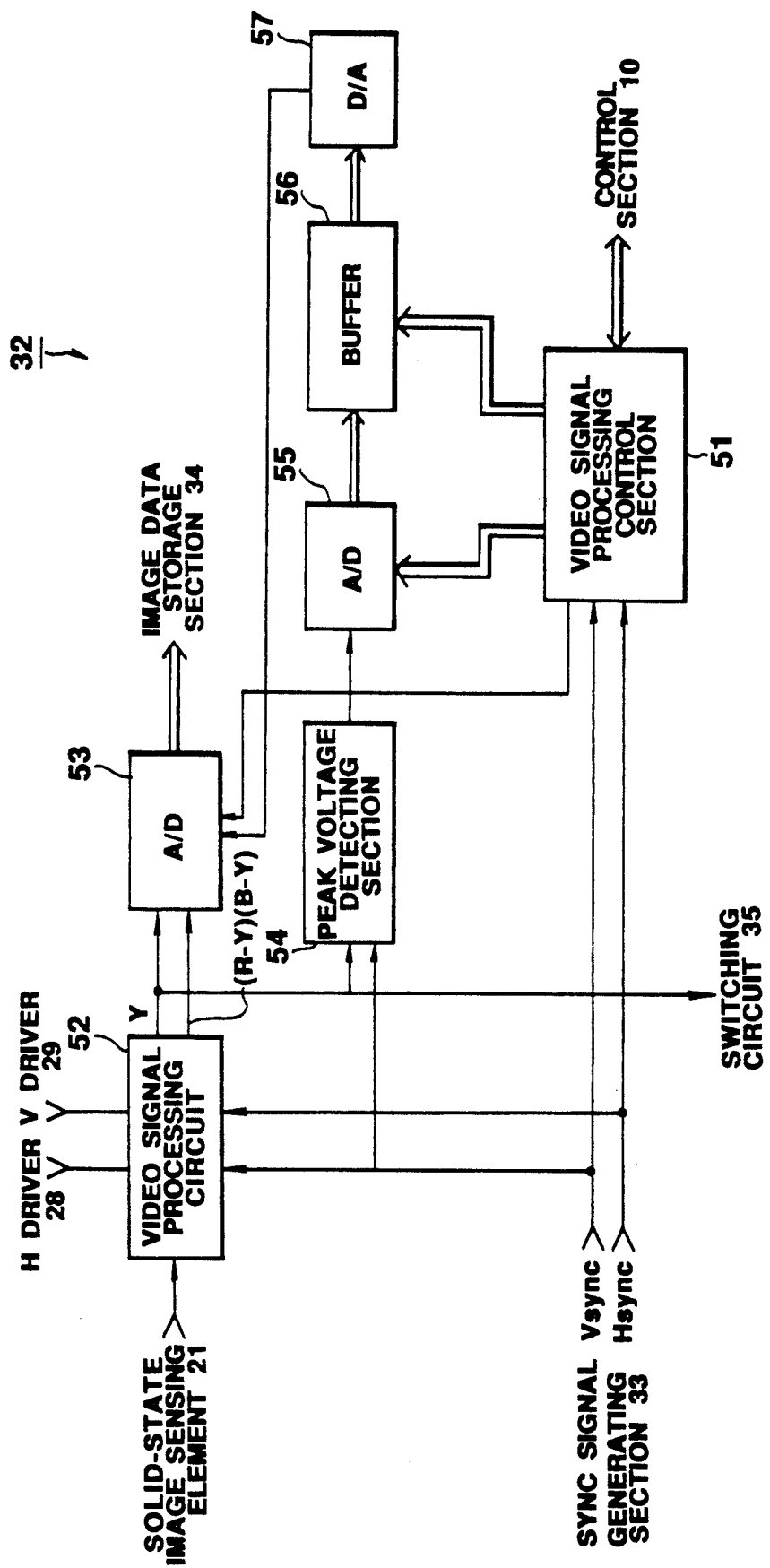
FIG. 5 is a block diagram showing a detailed circuit arrangement of a video signal processing section of the electronic still camera in FIG. 1.

A video signal processing control section 51 shown in FIG. 5 is controlled by the control section 10. A video signal processing circuit 52 receives scan signals from the H driver 28 and the V driver 29, respectively, and also receives the horizontal sync signal $H_{sync}$ and the vertical sync signal $V_{sync}$ from the sync signal generating section 33. The circuit 52 then forms the luminance signal Y and the color difference signals (R−Y) and (B−Y) from a video signal output from the solid-state image sensing element 21 and outputs them. More specifically, the video signal processing circuit 52 outputs the luminance signal Y to the switching circuit 35, an A/D converter 53, and a peak voltage detecting section 54, and supplies the color difference signals (R−Y) and (B−Y) to the A/D converter 53.

The peak voltage detecting section 54 receives the luminance signal Y corresponding to one frame of the solid-state image sensing element 21 from the video signal processing circuit 52, and detects the maximum voltage level, i.e., the video signal level of the brightest portion of the optical subject image. The maximum voltage signal of the video signal, which is detected by the peak voltage detecting section 54, is supplied to an A/D converter 55. In response an operation command output from the image signal processing control section 51 in response to the horizontal sync signal $H_{sync}$ immediately before the vertical sync signal $V_{sync}$ is output from the sync signal generating section 33, i.e., the last horizontal sync signal of one frame, the A/D converter 55 converts the maximum voltage signal in one frame, which is detected by the peak voltage detecting section 54, into a digital signal. The digital voltage signal having the maximum voltage level in one frame, which is obtained by A/D conversion by the A/D converter 55, is transferred to a buffer 56 to be temporarily stored.

In response to an operation command output from the video signal processing control section 51 in response to the vertical sync signal $V_{sync}$ from the sync signal generating section 33, the buffer 56 transfers the digital voltage signal having the maximum voltage in one frame, which is supplied from the A/D converter 55, to a D/A converter 57 to convert it into an analog voltage signal. The maximum voltage signal in one frame D/A-converted by the D/A converter 57 is supplied to the A/D converter 53 as a reference voltage on the high voltage side for A/D conversion.

The A/D converter 53 divides the difference between the maximum voltage signal supplied from the D/A converter 57 and 0 volts by $2^n$ (n is the number of bits), thus obtaining reference voltage levels for A/D conversion.

The A/D converter 53 compares the obtained reference voltage levels with the luminance signal Y and the color difference signals (R−Y) and (B−Y) supplied through the video signal processing section 52, thus converting the luminance signal Y and the color difference signals (R−Y) and (B−Y) into a digital signal. The digital video signal obtained by the A/D converter 53 is transferred to the image data storage section 34 constituted by, e.g., a video RAM, and stored.

In the A/D converter 53, since A/D conversion is performed by using the maximum voltage signal corresponding to the maximum value of the luminance signal Y of the optical subject image sensed in advance as the high-voltage side reference voltage, an image signal can always be converted into a digital signal with a maximum resolution.

Figure 6:
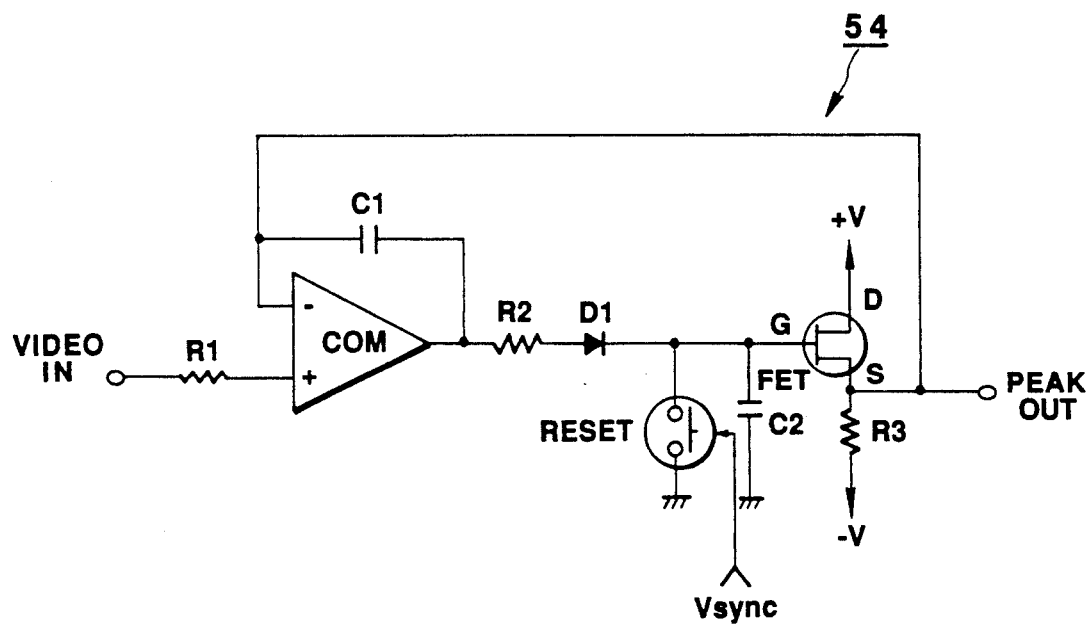
FIG. 6 is a circuit diagram showing an arrangement of a peak voltage detecting section in FIG. 5.

FIG. 6 shows an internal arrangement of the peak voltage detecting section 54. The luminance signal Y supplied from the video signal processing circuit 52 through a video signal input terminal VIDEOin is input to an input terminal (+) of a comparator COM through a resistor R1. A high-frequency feedback circuit consisting of a combination of a resistor R2 and a capacitor C1 is connected between the output terminal and an input terminal (−) of the comparator COM. A gate G of a junction type FET is connected to the output terminal of the comparator COM through the resistor R2 and a diode D1. A reset switch RESET, which is turned on in response to the vertical sync signal $V_{sync}$, and a capacitor C2 are respectively connected in parallel between the diode D1 and the FET gate G, and the respective ground terminals. A drain D of the junction type FET is connected to a power supply terminal (+V). A source S of the FET is connected to the input terminal (−) of the comparator COM and is also connected to a power supply terminal (−) through a resistor R3. An output voltage from the source S of the FET is applied to the A/D converter 55 through a maximum voltage output terminal PEAK OUT.

The capacitor C2 is charged in accordance with the voltage level of the one-frame luminance signal Y from the instant at which the vertical sync signal $V_{sync}$ is input from the sync signal generating section 33 to the instant at which the next vertical sync signal $V_{sync}$ is input. With this operation, the maximum voltage signal in one frame can be obtained from the maximum voltage output terminal PEAK OUT immediately before the vertical sync signal $V_{sync}$ is output.

Automatic exposure control processing of the electronic still camera having the above-described arrangement will be described below.

Figure 7:
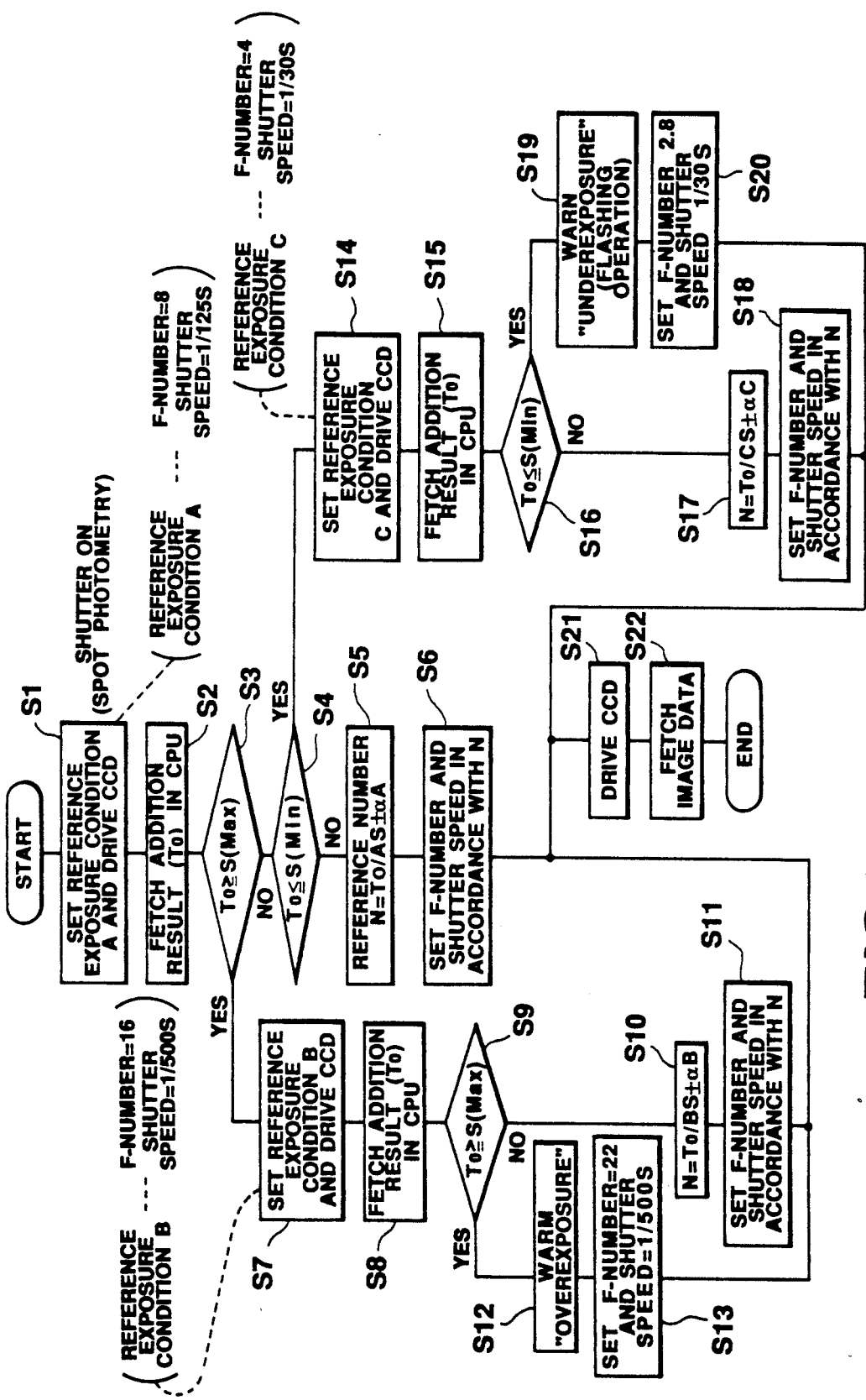
FIG. 7 is a flow chart for explaining an automatic exposure control processing operation of the electronic still camera in FIG. 1.

FIG. 7 is a flow chart showing this automatic exposure control processing. An operator determines a subject to be photographed through the viewfinder 14, and designates spot photometry and a photometric area by using the area designating section 13 to perform AE control. The designated photometric area is displayed on the liquid crystal display section 15 by the liquid crystal display driving section 16. Note that the area of the photometric area in spot photometry is fixed, and only its position can be changed. In this case, if the release switch 12 is depressed to the first stroke, i.e., shallowly to input a first stroke signal S1 to the control section 10, this automatic exposure control processing is started.

When the first stroke signal S1 is input from the release switch 12 to the control section 10, exposure-time data and an f-number corresponding to the reference exposure condition A shown in FIG. 3 are output from the reference exposure data converting section 49 of the automatic exposure processing section 27 to the exposure-time data storage section 31 and the iris motor driving control section 26, respectively. As a result, the iris 19 is set at f-number F=8 by the iris driving motor 25. The transfer control section 30 controls the H driver 28 and the V driver 29 on the basis of the exposure time stored in the exposure-time data storage section 31 so as to expose the solid-state image sensing element 21 for 1/125 seconds (step S1). The luminance signal Y of a region corresponding to the designated photometric area is supplied from the video signal processing section 32 to the automatic exposure processing section 27 through the switching circuit 35. In the automatic exposure processing section 27, the luminance signal Y is converted into a digital signal by the A/D-converting section 41 and is added by the high-speed adding section 42. With this operation, the luminance addition value T0 corresponding to the spot photometric area of the solid-state image sensing element 21 is fetched in the exposure control section 43 (step S2).

The exposure control section 43 causes the validity determining section 47 to determine whether the luminance addition value T0 fetched from the high-speed adding section 42 is larger than the reference value S(Max) indicating a saturation state, or smaller than the reference value S(Min) indicating a dark state (steps S3 and S4). If NO in both steps S3 and S4, i.e., if the luminance addition value T0 falls within the range of S(Max) to S(Min), the exposure control section 43 causes the calculating section 44 to calculate the reference value N according to equation (1) (step S5). When the reference value N (=T0/(AS+αA) to T0/(AS−αA)) is obtained, an A reference value closest to the range of the reference value N is selected from a exposure correction conversion table of the exposure time/f-number converting section 45 by a reference value determining section 46 (step S6). If, for example, the reference value N is T0/(AS+αA)=0.8 to T0/(AS−αA)=0.6, an A reference value=0.709 is selected. In this case, the shutter speed S is set to be 1/125; and the f-number F, 9.5. In accordance with these set values, the converting section 45 supplies exposure-time data for exposing the solid-state image sensing element 21 for 1/125 seconds to the exposure-time data storage section 31, and at the same time, supplies an iris control signal for setting the iris 19 at the f-number F=9 to the iris motor driving control section 26.

If YES in step S3, i.e., if the luminance addition value T0 corresponding to the designated photometric area is larger than the S(Max) indicating a saturation state, it is determined that a shutter speed and the like cannot be determined on the basis of the luminance addition value T0 obtained under the reference exposure condition A. Consequently, exposure-time data and an f-number corresponding to the reference exposure condition B are respectively output to the exposure-time data storage section 31 and the iris motor driving control section 26. With this operation, the iris 19 is set at the f-number F=16 by the iris driving motor 25. The solid-state image sensing element 21 is exposed at a shutter speed S=1/500 seconds on the basis of the exposure time stored in the exposure-time data storage section 31 (step S7). Subsequently, the luminance signal Y from each pixel of the designated photometric area is supplied again from the video signal processing circuit 32 to the automatic exposure processing section 27 through the switching circuit 35 and is digitally added by the high-speed adding section 42. With this operation, the luminance addition data T0 obtained under the reference exposure condition B corresponding to the spot photometric spot of the solid-state image sensing element 21 is fetched in the exposure control section 43 (step S8).

In this case, the exposure control section 43 causes the validity determining section 47 to determine whether the luminance addition value T0 supplied from the high-speed adding section 42 exceeds the reference value S(Max) indicating a saturation state (step S9). If NO in step S9, i.e., if it is determined that the luminance addition value T0 corresponding to the designated photometric area does not reach the reference value S(Max) upon a change in exposure condition to the reference exposure condition B, and an exposure condition can be determined on the basis of the luminance addition value T0 under the reference exposure condition B, the flow advances to step S10. In step S10, the exposure control section 43 causes the calculating section 44 to calculate the reference value N according to equation (2). When the reference value N corresponding to the reference exposure condition B, i.e., T0/(BS+αB) to T0/(BS−αB), is obtained in step S10, a B reference value closest to the range of this reference value N is selected from the conversion table of the exposure time/f-number converting section 45 by the reference value determining section 46 (step S11). If, for example, the reference value N is calculated as T0/(BS+αB)=2.5 to T0/(AS−αA)=1.8, a B reference value=2.083 is selected. In this case, the shutter speed S is set to be 1/250 seconds; and the f-number F, 16. Exposure-time data for exposing the solid-state image sensing element 21 for 1/250 seconds is supplied from the exposure time/f-number converting section 45 to the exposure-time data storage section 31. At the same time, an iris control signal for setting the iris 19 at the f-number F=16 is output from the exposure time/f-number converting section 45 to the iris motor driving control section 26.

If YES in step S9, i.e., if it is determined that proper exposure cannot be performed on the basis of the luminance addition value T0 under the reference exposure condition B, an alarm means (not shown), such as alarm sound or flickering of an LED, warns the operator about "overexposure" (step S12). In order to handle this "overexposure" state, the shutter speed S and the f-number F are respectively set to be 1/500 and 22 to minimize the amount of light incident on the solid-state image sensing element 21. Subsequently, exposure-time data for exposing the solid-state image sensing element 21 for 1/500 seconds is supplied from the exposure time/f-number converting section 45 to the exposure-time data storage section 31. At the same time, an iris control signal for setting the iris 19 at the f-number F=22 is output from the exposure time/f-number converting section 45 to the iris motor driving control section 26 (step S13).

If YES in step S4, i.e., if it is determined that the luminance addition value T0 corresponding to the designated photometric area is smaller than the S(Min)

indicating a dark state, and exposure correction cannot be performed on the basis of the luminance addition value T0 under the reference exposure condition A, the flow advances to step S14. In step S14, exposure-time data and an f-number corresponding to the reference exposure condition C are respectively output to the exposure-time data storage section 31 and the iris motor driving control section 26. As a result, the iris 19 is set at the f-number f=4 by the iris driving motor 25, and the solid-state image sensing element 21 is exposed at the shutter speed S=1/30 under the control of the transfer control section 30 through the H driver 28 and the V driver 29 on the basis of the exposure time stored in the exposure-time data storage section 31. Subsequently, the luminance signal Y from each pixel of the designated photometric area is supplied from the video signal processing section 32 to the automatic exposure processing section 27 through the switching circuit 35 and is digitally added by the high-speed adding section 42. With this operation, the luminance addition value T0 under the reference exposure condition C corresponding to the spot photometric area of the solid-state image sensing element 21 is fetched in the exposure control section 43 (step S15).

In this case, the exposure control section 43 causes the validity determining section 47 to determine whether the luminance addition value T0 fetched from the high-speed adding section 42 is still smaller than the reference value S(Min) indicating a dark state even in an image sensing operation under the reference exposure condition C (step S16). If NO in step S16, i.e., if it is determined that the luminance addition value T0 of the designated photometric area exceeds the reference value S(Min) after the reference exposure condition C is set, the exposure control section 43 causes the calculating section 44 to calculate the reference value N according to equation (3) (step S17). When the reference value N is calculated in step S17, a C reference value closest to the reference value N is selected from the exposure correction conversion table of the exposure time/f-number converting section 45 by the reference value determining section 46 (step S18). If, for example, the reference numeral N is T0/(CS+$\alpha$C)=0.6 to T0/(CS−$\alpha$C)=0.4, a C reference value=0.529 is selected. In this case, the shutter speed is set to be 1/60; and the f-number F, 4. Consequently, exposure-time data for exposing the solid-state image sensing element 21 for 1/60 seconds is supplied from the exposure time/f-number converting section 45 to the exposure-time data storage section 31. At the same time, an iris control signal for setting the iris 19 at the f-number F=4 is output from the exposure time/f-number converting section 45 to the iris motor driving control section 26.

If YES in step S16, i.e., the luminance addition value T0 corresponding to the designated photometric area is still smaller than the reference value S(Min) even in an image sensing operation under the reference exposure condition C, proper exposure cannot be performed on the basis of the luminance addition value T0 under the reference exposure condition C. In this case, an alarm means (not shown), such as alarm sound or flickering of an LED, warns the operator about "underexposure", and a flashing operation is prepared (step S19). In order to handle this "underexposure" state, the shutter speed S and the f-number F are respectively set to be 1/30 and 2.8 to maximize the amount of light incident on the solid-state image sensing element 21. Subsequently, exposure-time data for exposing the solid-state image sensing element 21 at a shutter speed of 1/30 seconds is supplied from the exposure time/f-number converting section 45 to the exposure-time data storage section 31. At the same time, an iris control signal for setting the iris 19 at the f-number F=2.8 is output from the exposure time/f-number converting section 45 to the iris motor driving control section 26 (step S20).

That is, in one of steps S6, S11, S13, S18, and S20, the exposure-time data S is written in the exposure-time data storage section 31, and an iris control signal corresponding to the f-number F is output to the iris motor driving control section 26. If a second stroke signal S2 indicating that the release switch 12 is depressed deeply is input from the release switch 12 to the control section 10 in this state, the solid-state image sensing element 21 is exposed for a proper time while the iris 19 is adjusted to the proper f-number F (step S21). Subsequently, an electric signal stored in each pixel of the solid-state image sensing element 21 is supplied to the video signal processing section 32 to be separated into the luminance signal Y and the color difference signals (R−Y) and (B−Y). Thereafter, the signals are A/D-converted and are supplied, as image data, to the image data storage section 34, which is address-designated by the control section 10, and are stored therein (step S22).

Note that the above-described automatic exposure control processing is associated with control for spot photometry. In control for total photometry, comparison processing in relation to the luminance addition value T0 in steps S3, S4, S9, and S10 is performed by using reference values T(Max) and T(Min), and calculation for obtaining a reference value in steps S5, S10, and S17 is performed by using equations (4) to (6).

A/D conversion of a video signal in the video signal processing section 32 having the above-described arrangement will be describe below.

FIGS. 8A to 8E are timing charts respectively showing the waveforms of electric signals at respective portions in the video signal processing section upon an input operation of an input video signal.

Figure 8:
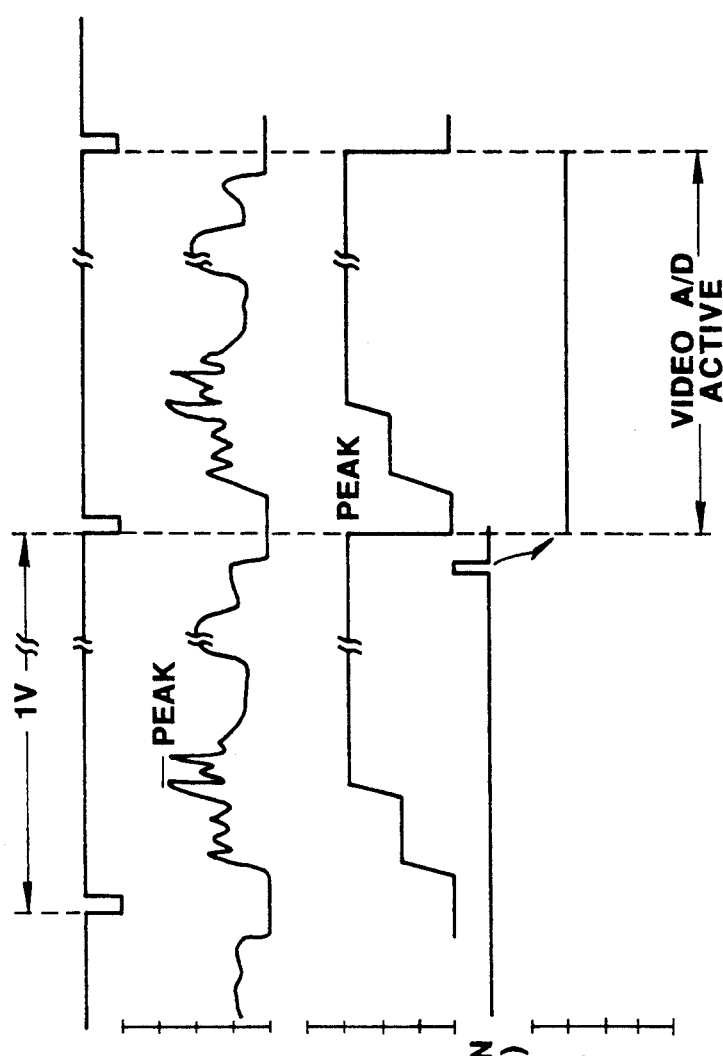
FIGS. 8A to 8E are timing charts respectively showing the waveforms of electric signals at corresponding portions in the video signal processing section shown in FIG. 5 upon an input operation of an input video signal when the video signal is A/D-converted.

A video signal, of the first field, output from the solid-state image sensing element 21 is sequentially supplied, as the luminance signal Y, to the video signal input terminal VIDEOin of the peak voltage detecting section 54 through the video signal processing circuit 52, as shown in FIG. 8B. Upon supply of the luminance signal Y to the video signal input terminal VIDEOin, the capacitor C2 of the peak voltage detecting section 54 receives the high-voltage level luminance signal Y sequentially obtained by the effect of a comparator A. A voltage corresponding to the peak level of the luminance signal is sequentially obtained at the maximum voltage output terminal PEAK OUT through the FE due to the charging effect of the capacitor C2, as shown in FIG. 8C. In addition, the maximum voltage obtained at the maximum voltage output terminal PEAK OUT is fetched in the A/D converter 55 in synchronism with the horizontal sync signal $H_{sync}$ output immediately before the vertical sync signal $V_{sync}$ is output, i.e., the last horizontal sync signal of the one-field video signal, under the control of the video signal processing control section 51. The fetched voltage is then converted into digital data and stored in the buffer 56, as shown in FIGS. 8A, 8D, and 8E.

When the next vertical sync signal $V_{sync}$ is output, the digital data representing the maximum voltage, which is stored in the buffer 56, is converted into an analog level by the D/A converter 57. The output from the D/A converter 57 is then supplied to the A/D converter 53 as a high-voltage side A/D conversion reference voltage.

With this operation, the luminance signal Y and the color difference signals (R−Y) and (B−Y) corresponding to the second field, which are supplied to the A/D converter 53, are converted into a digital signal by using the maximum voltage signal, of first field, supplied from the D/A converter 57, as a high-voltage side reference voltage. The digital signal is then transferred to the image data storage section 34 constituted by, e.g., a RAM, and stored therein.

According to the video signal processing section 32 having the above-described arrangement, therefore, A/D conversion is performed by using the maximum voltage signal corresponding to the maximum luminance signal Y, which is obtained in advance by an image sensing operation, as a high-voltage side reference voltage. Therefore, the video signal processing section 32 can always perform digital conversion of a video signal with a maximum resolution.

The second embodiment of the present invention will be described below with reference to FIGS. 9 to 11.

Figure 9:
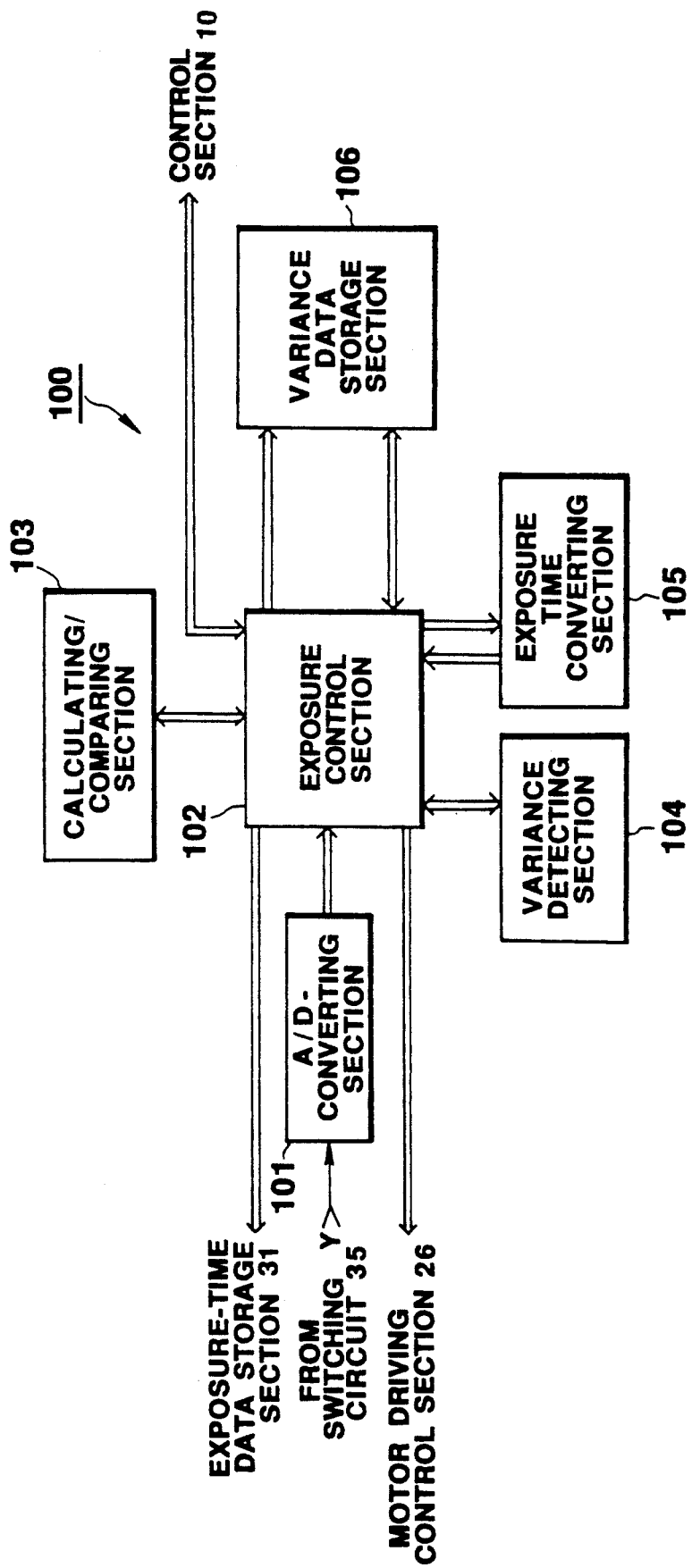
FIG. 9 is a block diagram showing another arrangement of the automatic exposure processing section of the electronic still camera in FIG. 1, i.e., an automatic exposure control apparatus according to the second embodiment of the present invention.

FIG. 9 shows an automatic exposure processing section 100. This automatic exposure processing section 100 is arranged in an electronic still camera in place of the automatic exposure processing section 27 arranged in the electronic still camera according to the first embodiment.

Similar to the automatic exposure processing section 27 in the first embodiment, the automatic exposure processing section 100 receives a luminance signal Y from a video signal processing section 32 through a switching circuit 35.

Subsequently, the luminance signal Y is supplied to an A/D converter 101. The luminance signal Y is converted into a digital signal by the A/D converter 101 and is supplied to an exposure control section 102.

The exposure control section 102 is controlled by a control section 10 to perform automatic exposure control. In addition to the A/D converter 101, the following components are connected to the exposure control section 102: a calculating/comparing section 103, a variance detecting section 104, an exposure time converting section 105, and a variance data storage section 106.

The calculating/comparing section 103 adds digital data output from the A/D converter 101 to obtain a luminance addition value of a photometric area, and compares the magnitudes of luminance variances generated by the variance detecting section 104 to be described later.

The luminance addition value obtained by the calculating/comparing section 103 is supplied to the exposure time converting section 105 through the exposure control section 102. The exposure time converting section 105 obtains a proper exposure time of the solid-state image sensing element 21 on the basis of the luminance addition value, and outputs it to an exposure-time data storage section 31 through the exposure control section 102.

The variance detecting section 104 detects the distribution range of luminance in a photometric area in accordance with digital data supplied from the A/D converting section 101 through the exposure control section 102. A variance (the maximum luminance − the minimum luminance) representing the luminance distribution range obtained by the variance detecting section 104 is stored in the variance storage section 106 through the exposure control section 102. At the same time, the variance is supplied to the calculating/comparing section 103 together with the variance already stored in the variance data storage section 106. In the calculating/comparing section 103, the magnitudes of these values are compared.

The exposure control section 102 outputs a diaphragm control signal to a motor driving control section 26 in accordance with the comparison result from the calculating/comparing section 103.

That is, the automatic exposure processing section 100 of this embodiment controls the f-number to cause the variance detecting section 104 to obtain a maximum variance. In this case, as shown in FIG. 10, when a diaphragm 19 is set at an aperture larger than a proper aperture, since the luminance distribution tends to concentrate on a bright portion, as indicated by a dotted curve b, the distribution range is narrowed to decrease the luminance variance. When the diaphragm 19 is set at an aperture smaller than the proper aperture, since the luminance distribution tends to concentrate on a dark portion, as indicated by an alternate long and two dashed curve c, the distribution range is also narrowed to decrease the luminance variance. If, therefore, the diaphragm 19 is set at the proper aperture, since the luminance is distributed in a widest range corresponding to the contrast of a subject to be photographed, a widest distribution range is obtained, as indicated by a solid curve a, thus increasing the variance.

That is, a proper exposure value can be obtained by controlling the aperture of the diaphragm 19 to maximize the variance.

An operation of the automatic exposure processing section 100 of this embodiment will be described below with reference to a flow chart in FIG. 11.

Similar to the first embodiment, an operator determines a subject to be photographed through a viewfinder 14, and designates a photometric area for AE control by using an area designating section 13. At the same time, the operator depresses a release switch 12 to the first stroke. As a result, automatic exposure control processing is started under the control of the control section 10.

When a diaphragm control signal is supplied from the exposure control section 102 to the motor driving control section 26, a diaphragm driving motor 25 is driven in a full-open direction to set the diaphragm 19 in the fully open state (step S31). In addition, the exposure control section 102 sets a predetermined initial exposure time (e.g., 1/250 sec) in the exposure-time data storage section 31, and the solid-state image sensing element 21 is exposed in accordance with the set exposure time (step S32). As a result, an optical subject image incident through the diaphragm 19 and photographing lenses 18 and 20 is formed on the solid-state image sensing element 21. A video signal corresponding to the amount of incident light within the exposure time is supplied to the video signal processing section 32. The luminance signal Y obtained by the video signal processing section 32 is output to the A/D converting section 101 through the switching circuit 35 and is supplied to the exposure control section 102 as a digital video signal in accordance with the luminance of the luminance signal Y (step S33).

In this case, the control section 10 supplies the digital video signal to the calculating/comparing section 103, thus causing the section 103 to calculate a luminance addition value. This luminance addition data of sensed signals corresponding to the initial exposure state is supplied to the exposure time converting section 105 (steps S34 and S35). The exposure time converting section 105 selects a proper exposure time (shutter speed) of the solid-state image sensing element 21 from a luminance addition value/exposure time conversion table (not shown) in the section 105, in accordance with the luminance addition data supplied from the exposure control section 102. The proper exposure-time data selected by the exposure time converting section 105 is set in the exposure-time data storage section 31 in place of the initial exposure time set in step S32 (step S36). At this time, the diaphragm 19 is adjusted to be in a fully closed state by a diaphragm control signal supplied from the exposure control section 102 to the motor driving control section 26. In addition, the variance data storage section 106 is cleared by the control section 10 (steps S37 and S38).

Subsequently, the diaphragm 19 is opened by a degree corresponding to one step of the diaphragm driving motor 25 (step S39). While the diaphragm 19 is opened from the fully closed state by a degree corresponding to one motor step, an optical subject image incident through the diaphragm 19 and the photographing lenses 18 and 20 is formed on the solid-state image sensing element 21. A video signal corresponding to the amount of incident light within the proper exposure time is transferred, as a digital video signal, to the exposure control section 102 through the A/D converting section 101 (step S40). The digital video signal supplied to the exposure control section 102 is transferred to the variance detecting section 104, and the distribution range of luminances is detected (step S41).

The calculating/comparing section 103 compares the luminance variance of the designated photometric area, which is detected at the aperture increased from the fully closed state by one step, with the previously detected variance data stored in the variance data storage section 106. In this case, since the variance data storage section 106 has just been cleared in step S38, the currently detected luminance variance is determined to be "larger" and is written in the variance data storage section 106 (steps S42 and S43). The exposure control section 102 checks on the basis of the number of driving steps of the diaphragm driving motor 25 whether the diaphragm 19 has reached a fully open state. In this case, since the diaphragm 19 is just opened from the fully closed state by one step, "NO" is obtained, and the flow returns to the one-step diaphragm opening processing in step S9 (step S44).

Subsequently, by repeating the processing in steps S9 to S14, the diaphragm 19 is sequentially opened in units of motor steps. Meanwhile, the luminance variances of data obtained by image sensing operations at the respective apertures are detected by the variance detecting section 104 and are repeatedly compared with the variance stored in the variance data storage section 106.

Figure 10:
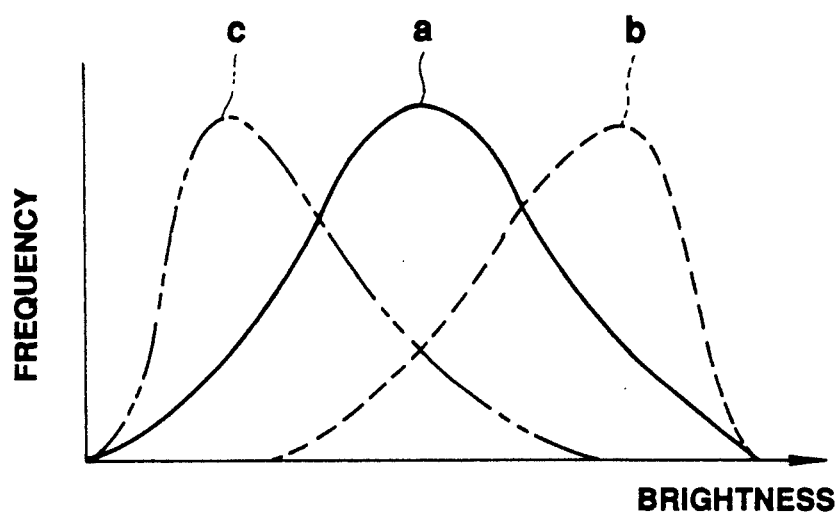
FIG. 10 is a graph for explaining a relationship between an exposure value and the luminance distribution of a sensed signal in a case wherein exposure control is performed by the automatic exposure processing section shown in FIG. 9.
Figure 11:
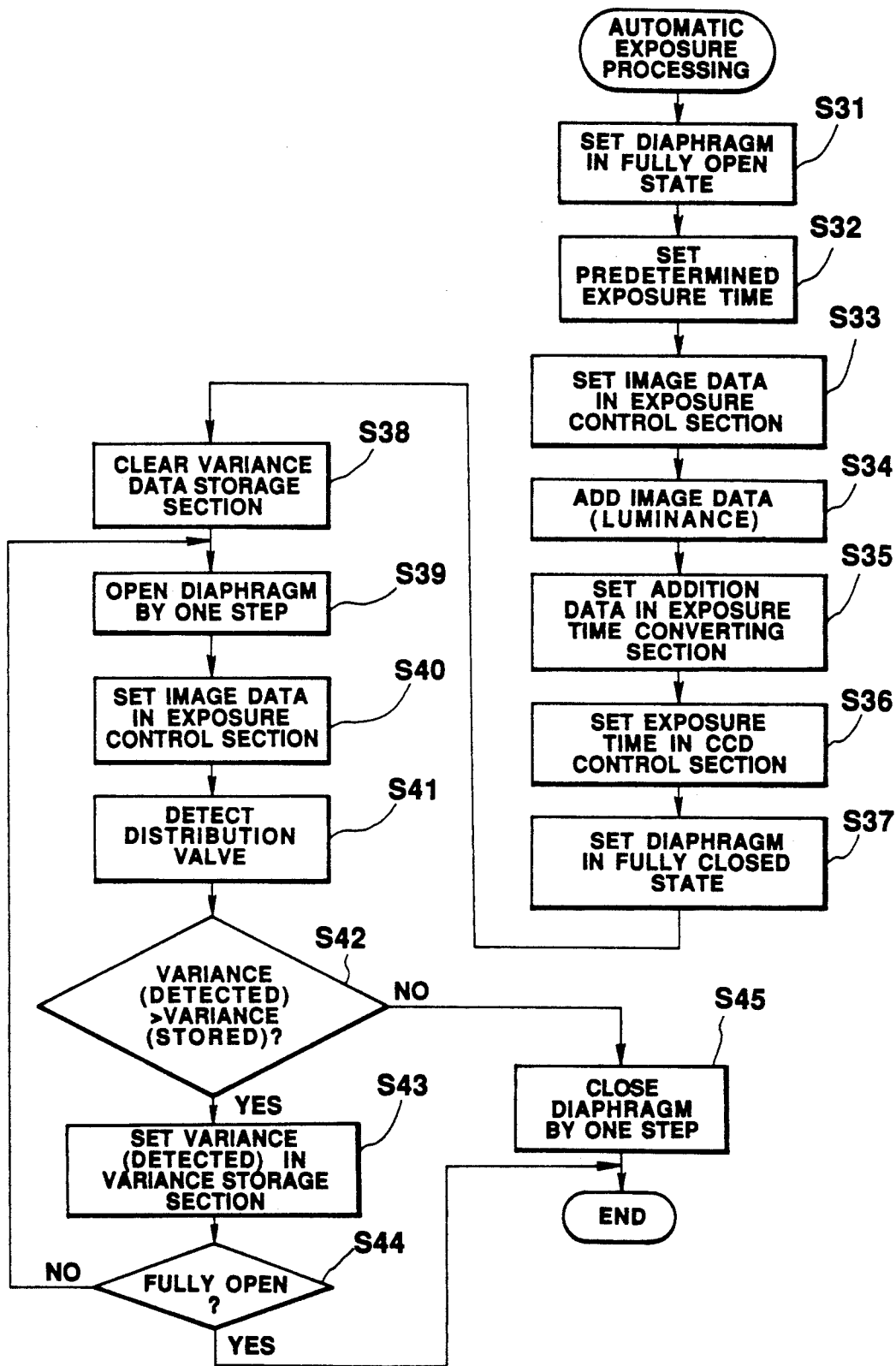
FIG. 11 is a flow chart for explaining an automatic exposure control processing operation of the automatic exposure processing section in FIG. 9.

That is, if an optimal exposure time is set in the exposure-time data storage section 31, and the diaphragm 19 is sequentially opened from the fully closed state in units of motor steps, the luminance distribution range of an optical subject image formed on the solid-state image sensing element 21 is gradually widened, and, for example, the luminance distribution characteristic curve c is shifted to the curve a in FIG. 10. At this time, if NO in step S42, i.e., if the luminance variance based on the previously set aperture becomes larger than the luminance variance of the data obtained by the image sensing operation based on the currently set aperture, e.g., if it is determined that the current luminance distribution characteristic curve is deviated from the curve a toward the curve b by one motor step, the exposure control section 102 controls the diaphragm 19 in a direction to close it by one motor step by using a diaphragm control signal supplied to the motor driving control section 26, thereby restoring the incidence state of the optical subject image with respect to the solid-state image sensing element 21 to the state wherein a maximum luminance variance can be obtained (step S45).

With this operation, the diaphragm 19 is set at a proper aperture, and a proper exposure time is set in the exposure-time data storage section 31. When the release switch 12 is depressed to the second stroke in this state, an optical subject image formed on the solid-state image sensing element 21 under the optimal exposure condition is written, as a digital video signal, in an image data storage section 34 through the video signal processing section 32.

According to the electronic still camera having the above-described AE function, aperture control of the diaphragm 19 is performed before a photographing operation such that the luminance distribution range of an optical subject image formed on the solid-state image sensing element 21 becomes a maximum range. Even if, therefore, a photographic area includes an excessively bright portion, or a small character on a white background is to be photographed, a photographing operation can be performed under an optimal exposure state to obtain an image having a clear contrast, thus preventing the entire photographic area from becoming a dark image or preventing the character portion from becoming unclear.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic camera comprising:
   optical means having a diaphragm, for focusing an optical image of a subject on a predetermined plane;
   image sensing means provided on said predetermined plane, for sensing an optical image focused by said optical me ans so as to convert the sensed image into electric signals;
   luminous energy level detecting mean for detecting a level of luminous energy based on the electric signals produced by said image sensing means;
   exposure condition determining means for determining exposure-time data and diaphragm control data in response to the level of luminous energy detected by said luminous energy level detecting means, so as to obtain the proper exposure condition;
   exposure-time control means for controlling, based on the exposure time data determined by said exposure condition determining means, a time the optical image is exposed to said image sensing means for being converted into electric signals;
   diaphragm control means for controlling said diaphragm of said optical means based on the diaphragm control data determined by said exposure condition determining means, so as to control an amount of light to which said image sensing means is exposed; and processing means for processing the electric signals produced by said image sensing means at the proper exposure condition determined by said exposure condition determining means, so as to produce a video signal;

said exposure condition determining means including calculating means for calculating a reference number based on the level of luminous energy detected by said luminous energy level detecting means, means for determining the exposure-time data and the diaphragm control data based on the reference number calculated by said calculating means, and conversion table means for storing a reference number, exposure-time data and diaphragm control data, said conversion table means outputting the exposure-time data and the diaphragm control data in response to the reference number calculated by said calculating means.

2. The electronic camera according to claim 1, wherein said exposure condition determining means includes first basic exposure condition determining means for determining first predetermined exposure time data and first predetermined diaphragm control data, so as to obtain a first basic exposure condition;

said exposure control means further including means for controlling, based on the first predetermined exposure time data determined by said first basic exposure condition determining means, the time that the optical image is exposed to said image sensing means for being converted into electric signals;

said diaphragm control means including means for controlling the diaphragm of said optical means based on the first predetermined diaphragm control data determined by said first basic exposure condition determining means; and said luminous energy level detecting means including means for detecting the level of luminous energy based on the electric signals produced by said image sensing means at the first basic exposure condition.

3. The electronic camera according to claim 1, wherein said processing means includes analog-digital converting means for converting the electric signals produced by said image sensing means into a digital video signal.

4. An electronic camera comprising:

optical means having a diaphragm, for focusing an optical image of a subject on a predetermined plane;

image sensing means provided on said predetermined plane, for sensing an optical image focused by said optical means so as to convert the sensed image into electric signals;

luminous energy level detecting means for detecting a level of luminous energy based on the electric signals produced by said image sensing means;

exposure condition determining means for determining exposure-time data and diaphragm control data in response to the level of luminous energy detected by said luminous energy level detecting means, so as to obtain the proper exposure condition;

exposure-time control means for controlling, based on the exposure time data determined by said exposure condition determining means, a time the optical image is exposed to said image sensing means for being converted into electric signals;

diaphragm control means for controlling said diaphragm of said optical means based on the diaphragm control data determined by said exposure condition determining means, so as to control an amount of light to which said image sensing means is exposed; and processing means for processing the electric signals produced by said image sensing means at the proper exposure condition determined by said exposure condition determining means, so as to produce a video signal;

said exposure condition determining means including first basic exposure condition determining means for determining first predetermined exposure time data and first predetermined diaphragm control data, so as to obtain a first basic exposure condition;

said exposure control means further including means for controlling, based on the first predetermined exposure time data determined by said first basic exposure condition determining means, the time that the optical image is exposed to said image sensing means for being converted into electric signals;

said diaphragm control means including means for controlling the diaphragm of said optical means based on the first predetermined diaphragm control data determined by said first basic exposure condition determining means; and said luminous energy level detecting means including means for detecting the level of luminous energy based on the electric signals produced by said image sensing means at the first basic exposure condition; and said exposure condition determining means further including calculating means for calculating a reference number based on the level of luminous energy detected by said luminous energy level detecting means, and means for determining the exposure-time data and the diaphragm control data based on the reference number calculated by said calculating means.

5. An electronic camera comprising:

optical means having a diaphragm, for focusing an optical image of a subject on a predetermined plane;

image sensing means provided on said predetermined plane, for sensing an optical image focused by said optical means so as to convert the sensed image into electric signals;

luminous energy level detecting means for detecting a level of luminous energy based on the electric signals produced by said image sensing means;

exposure condition determining means for determining exposure-time data and diaphragm control data in response to the level of luminous energy detected by said luminous energy level detecting means, so as to obtain the proper exposure condition;

exposure-time control means for controlling, based on the exposure time data determined by said exposure condition determining means, a time the optical image is exposed to said image sensing means for being converted into electric signals;

diaphragm control means for controlling said diaphragm of said optical means based on the diaphragm control data determined by said exposure condition determining means, so as to control an amount of light to which said image sensing means is exposed; and processing means for processing the electric signals produced by said image sensing means at the proper exposure condition determined by said exposure condition determining means, so as to produce a video signal;

said exposure condition determining means including first basic exposure condition determining means for determining first predetermined exposure time data and first predetermined diaphragm control data, so as to obtain a first basic exposure condition;

said exposure control means further including means for controlling, based on the first predetermined exposure time data determined by said first basic exposure condition determining means, the time that the optical image is exposed to said image sensing means for being converted into electric signals;

said diaphragm control means including means for controlling the diaphragm of said optical means based on the first predetermined diaphragm control data determined by said first basic exposure condition determining means;

said luminous energy level detecting means including means for detecting the level of luminous energy based on the electric signals produced by said image sensing means at the first basic exposure condition;

said exposure condition determining means further including detection means for detecting whether or not the level of luminous energy detected by said luminous energy level detecting means based on the electric signals produced by said image sensing means at the first exposure condition is within a predetermined range, and second basic exposure condition determining means for determining second predetermined exposure time data and second predetermined diaphragm control data when said detection means detects that the level of luminous energy is outside the predetermined range, so as to obtain second basic exposure condition;

said exposure control means further including means for controlling, based on the second predetermined exposure time data determined by said second basic exposure condition determining means, the time that the optical image is exposed to said image sensing means for being converted into the electric signals;

said diaphragm control means further including means for controlling the diaphragm of said optical means based on the second predetermined diaphragm control data determined by said second basic exposure condition determining means; and said luminous energy level detecting means further including means for detecting the level of luminous energy based on the electric signals produced by said image sensing means at the second basic exposure condition.

6. The electronic camera according the claim 5, wherein said exposure condition determining means includes calculating means for calculating a reference number based on the level of luminous energy detected by said luminous energy level detecting means, and means for determining the exposure-time data and the diaphragm control data based on the reference number calculated by said calculating means.

7. An electronic camera comprising:

optical means having a diaphragm, for focusing an optical image of a subject on a predetermined plane;

image sensing means provided on said predetermined plane, for sensing an optical image focused by said optical means so as to convert the sensed image into electric signals;

luminous energy level detecting means for detecting a level of luminous energy based on the electric signals produced by said image sensing means;

exposure condition determining means for determining exposure-time data and diaphragm control data in response to the level of luminous energy detected by said luminous energy level detecting means, so as to obtain the proper exposure condition;

exposure-time control means for controlling, based on the exposure time data determined by said exposure condition determining means, a time the optical image is exposed to said image sensing means for being converted into electric signals;

diaphragm control means for controlling said diaphragm of said optical means based on the diaphragm control data determined by said exposure condition determining means, so as to control an amount of light to which said image sensing means is exposed; and processing means for processing the electric signals produced by said image sensing means at the proper exposure condition determined by said exposure condition determining means, so as to produce a video signal;

said processing means including analog-digital converting means for converting the electric signals produced by said image sensing means into a digital video signal, said analog-digital converting means including peak level detecting means for detecting a peak level of the electric signals produced by said image sensing means and reference determining means responsive to said level of luminous energy for determining a reference value, a plurality of reference levels obtained by dividing a range between the reference value and a predetermined value by a predetermined number being used for converting the electric signals into the digital video signal based on the peak level detected by said peak level detecting means.

8. An electronic camera comprising:

optical means having a diaphragm, for focusing an optical image of a subject on a predetermined plane;

image sensing means provided on said predetermined plane, for sensing an optical image focused by said optical means so as to convert the sensed image into electric signals;

luminous energy level detecting means for detecting a level of luminous energy based on the electric signals produced by said image sensing means;

exposure condition determining means for determining exposure-time data and diaphragm control data in response to the level of luminous energy detected by said luminous energy level detecting means, so as to obtain the proper exposure condition;

exposure-time control means for controlling, based on the exposure time data determined by said exposure condition determining means, a time the optical image is exposed to said image sensing means for being converted into electric signals;

diaphragm control means for controlling said diaphragm of said optical means based on the diaphragm control data determined by said exposure condition determining means, so as to control an amount of light to which said image sensing means is exposed; and processing means for processing the electric signals produced by said image sensing means at the proper exposure condition determined by said exposure condition determining means, so as to produce a video signal;

said exposure condition determining means including distribution range detecting means for detecting a distribution range with respect to the level of luminous energy detected by said luminous energy level detecting means, and diaphragm control data determining means for determining the diaphragm control data in response to the distribution range detected by said distribution range detecting means.

9. The electronic camera according to claim 8, wherein said exposure condition determining means further includes proper condition determining means for determining a proper exposure condition when said distribution range detecting means detects that the distribution range exceeds a given width.

10. The electronic camera according to claim 9, wherein said processing means includes analog-digital converting means for converting the electric signals produced by said image sensing means into digital video signal.

11. The electronic camera according to claim 10, wherein said analog-digital converting means includes peak level detecting means for detecting a peak level of the electric signals produced by said image sensing means; and reference determining means for determining a reference value of a high voltage for converting the electric signals into the digital video signal based on the peak level detected by said peak level detecting means.

12. The electronic camera according to claim 8, wherein said exposure condition determining means further includes basic exposure condition determining means for determining predetermined exposure time data and predetermined diaphragm control data, so s to obtain a basic exposure condition;

said exposure control means including means for controlling, based on the predetermined exposure time data determined by said basic exposure condition determining means, the time that the optical image is exposed to said image sensing means for being converted into the electric signals;

said diaphragm control means including means for controlling the diaphragm of said optical means based on the predetermined diaphragm control data determined by said basic exposure condition determining means; and said luminous energy level detecting means means for detecting the level of luminous energy based on the electric signals produced by said image sensing means at the basic exposure condition.

13. The electronic camera according to claim 12, wherein said exposure condition determining means further includes exposure-time determining means for determining the exposure-time data based on the level of luminous energy detected by said luminous energy level detecting means.

* * * * *